(12) United States Patent
Shapiro et al.

(10) Patent No.: US 11,216,490 B2
(45) Date of Patent: Jan. 4, 2022

(54) METHOD AND SYSTEM FOR THE CREATION AND MAINTENANCE OF A WEB PRESENCE DATA STORE BUILT AUTOMATICALLY FOR ALL ENTITIES WITH A SOCIAL MEDIA PRESENCE

(71) Applicants: Stephen Londy Shapiro, Carbondale, CO (US); Philip Carter Drew, Carbondale, CO (US)

(72) Inventors: Stephen Londy Shapiro, Carbondale, CO (US); Philip Carter Drew, Carbondale, CO (US)

(73) Assignee: Sopris Apps LLC, Carbondale, CO (US)

(*) Notice: Subject to any disclaimer, the term of this patent is extended or adjusted under 35 U.S.C. 154(b) by 418 days.

(21) Appl. No.: 15/884,631

(22) Filed: Jan. 31, 2018

(65) Prior Publication Data
US 2018/0218064 A1 Aug. 2, 2018

Related U.S. Application Data

(60) Provisional application No. 62/453,205, filed on Feb. 1, 2017.

(51) Int. Cl.
*G06F 16/28* (2019.01)
*G06F 16/13* (2019.01)
*G06F 16/27* (2019.01)
*G06F 16/951* (2019.01)

(52) U.S. Cl.
CPC ............ *G06F 16/285* (2019.01); *G06F 16/13* (2019.01); *G06F 16/27* (2019.01); *G06F 16/951* (2019.01)

(58) Field of Classification Search
CPC .............. G06F 16/9535; G06F 16/951; G06F 16/9577; G06F 16/437; G06F 16/285; G06F 16/9038; G06F 16/90335; G06F 16/9537; G06F 16/13; G06F 16/24; G06F 16/27; G06F 16/33
USPC ........... 707/600–831, 899, 999.001–999.206
See application file for complete search history.

(56) References Cited

U.S. PATENT DOCUMENTS

| | | | |
|---|---|---|---|
| 8,671,212 B2 * | 3/2014 | Smith | G06Q 40/00 709/231 |
| 2008/0270426 A1 * | 10/2008 | Flake | G06F 16/437 |
| 2010/0094878 A1 * | 4/2010 | Soroca | G06Q 30/02 707/748 |
| 2010/0174748 A1 * | 7/2010 | Strumpf | G06F 16/20 707/780 |
| 2012/0030767 A1 * | 2/2012 | Rippert, Jr. | G06Q 99/00 726/25 |
| 2013/0018878 A1 * | 1/2013 | Sansom | H04N 21/43615 707/728 |

(Continued)

*Primary Examiner* — Angelica Ruiz
(74) *Attorney, Agent, or Firm* — Andrew Morabito

(57) ABSTRACT

A method for categorizing content related to an entity comprising locating at least one source associated with an entity, requesting access to the at least one source, receiving a set of requirements to receive a first set of content from one of the at least one sources, accommodating the set of requirements associated with source, receiving the first set of content, parsing the first set of content, wherein predetermined content is removed thereby creating a second set of content, categorizing the second set of content based on a predetermined set of categories, wherein the categories are based on the source, and storing the second set of content.

5 Claims, 5 Drawing Sheets

(56) References Cited

U.S. PATENT DOCUMENTS

| | | | |
|---|---|---|---|
| 2015/0134684 A1* | 5/2015 | Montana | H04L 67/2819 |
| | | | 707/758 |
| 2016/0269497 A1* | 9/2016 | Glommen | H04L 67/306 |
| 2017/0193037 A1* | 7/2017 | Bhagwan | G06Q 30/0256 |
| 2017/0235848 A1* | 8/2017 | Van Dusen | G06F 16/904 |
| | | | 705/12 |

* cited by examiner

METHOD AND SYSTEM FOR THE CREATION AND MAINTENANCE OF A WEB PRESENCE DATA STORE BUILT AUTOMATICALLY FOR ALL ENTITIES WITH A SOCIAL MEDIA PRESENCE

BACKGROUND OF THE INVENTION

The technical field relates to extracting content programmatically over the Internet from sources hosted in a multitude of accessible locations, and more specifically, to a method and system for extracting content from a multitude of sources then organizing extracted content by commonalities and storing the content into an accessible data store.

A web presence is a look at the totality of all locations on the World Wide Web where an entity is represented. An entity can be a person, place, organization or concept (i.e. "Plate Tectonics" or "Nano Technology"). Examples of items found in a web presence could be a website, a microsite, a page on a review site, a wiki page, or a social media point of presence (e.g., a LinkedIn company page and/or group, a Facebook business/brand/product page, or a Twitter account).

When an entity (via a person acting on behalf of the entity), uses the Internet to search for content using a search engine, or reads content online, the amount of content associated with that entity's web presence may increase if the search engine or content host is tracking usage and offering some or all of that usage data to 3rd parties. Through the offering of this data to 3rd parties, the activity about the entity becomes available and therefore adds to that entity's web presence. For example, historical activity such as websites visited, searches made, videos watched, and usage of programs add to an entity's web presence.

In addition, the amount of content associated with a web presence increases when an entity (via a person acting on behalf of the entity), creates content on their own website or 3rd party content networks. For example, adding a new announcement on the entity's website, creating a post on social media, adding a new event, or adding files to an online drive all add to the web presence.

3rd party content is content associated with an entity and hosted on a content network ("Content Network"). 3rd party public content is any content which is retrievable programmatically over the Internet without the content creator's consent. Most often, content is retrieved by an Application Protocol Interface (API) offered by the Content Network. Some Content Networks offer content via an API framework that requires the receiving system to make an API request. Other Content Networks use an API framework that requires the receiving system to use a commonly known technology called a Web Hook which is essentially a listener setup by the receiving party which receives new content by waiting for the Content Network to post to the API. Additionally, content may be retrieved through other technologies such as a web-crawler (often through PHP's CURL library) which can extract content from a website by mimicking a user.

Most, but not all API frameworks offer their content in the form of JSON Object (JavaScript Object Notation) which is a lightweight data-interchange format. Extracting the content from a JSON object will offer content by labeling fields. For example, a JSON object might include a field for Title, Body, Message or Image. Since each content network identifies their content fields differently, it's often difficult to find commonalities between Content Networks even though the underlying content has the same purpose. For example, twitter might call a post a "Tweet" while Facebook calls a post a "message." An additional example is found in the countless ways in which events are identified. An event created in Facebook and an event created in Google Calendar may be retrieved via API and/or web-crawler and/or the parsing of a calendar ICS file. Each of these methods cause different content to be retrieved even though they may refer to the same event.

The above examples show content used for different purposes. For example, a tweet, a message and a post may be considered of similar "type" due to their common purpose of posting a short message to an audience. Other forms of content such as events, news, videos and images are all considered content types ("Content Types"). Often, the ability to identify the type is difficult due to the unique offerings of a Content Network and the way in-which the content is received from the Content Network. Most often, the 3rd party content network itself is associated with a content type. For example, a YouTube source would be generally offer a "video" Content Type.

Significant time is being spent by entities creating content on countless Content Networks such as Facebook, Google+ and Twitter. The amount of time, combined with the time associated with keeping a website current can be a significant drain on an entity's resources.

Countless applications currently extract content from Content Networks. The methods to do so are time-consuming, technically challenging and require unique solutions for each Content Network.

Therefore, it would be advantageous to have a system that combines all Content Networks. Find commonalities between content and stores them into a datastore to be made available for 3rd party applications.

SUMMARY OF THE INVENTION

The present invention provides a method for categorizing content related to an entity comprising locating at least one source associated with an entity. Requesting access to the at least one source. Receiving a set of requirements to receive a first set of content from one of the at least one sources. Adhering to the set of requirements associated with source. Receiving the first set of content. Parsing the first set of content, wherein predetermined content is removed thereby creating a second set of content. Categorizing the second set of content based on a predetermined set of categories, wherein the categories are based on the source. Storing the second set of content.

In a second embodiment, a computer program product for categorizing content related to an entity comprising. Program instruction to locate at least one source associated with an entity. Program instructions to request access to the at least one source. Program instructions to receive a set of requirements to receive a first set of content from one of the at least one sources. Program instructions to accommodate the set of requirements associated with source. Program instructions to receive the first set of content. Program instructions parse the first set of content, wherein predetermined content is removed thereby creating a second set of content. Program instructions to categorize the second set of content based on a predetermined set of categories, wherein the categories are based on the source. Program instructions to store the second set of content.

In a third embodiment, a computer system for categorizing content related to an entity comprising. Program instruction to locate at least one source associated with an entity. Program instructions to request access to the at least one source. Program instructions to receive a set of requirements to receive a first set of content from one of the at least one sources. Program instructions to accommodate the set of requirements associated with source. Program instructions to receive the first set of content. Program instructions parse the first set of content, wherein predetermined content is removed thereby creating a second set of content. Program instructions to categorize the second set of content based on a predetermined set of categories, wherein the categories are based on the source. Program instructions to store the second set of content.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "frame", or "system." Furthermore, aspects of the present invention may take the form of a computer program product embodied in one or more computer readable medium(s) having computer readable program code/instructions embodied thereon. The system, method, or computer program product provides the benefit of facilitating content extraction from a multitude of sources on a per entity basis. The flexibility in structure and design, due to the ever-evolving number of content items and types that may be available and associated with an entity. The extracted content is based on the plethora or limited amount of web presence The present invention will now be described in detail with reference to the Figures.

Figure 1:
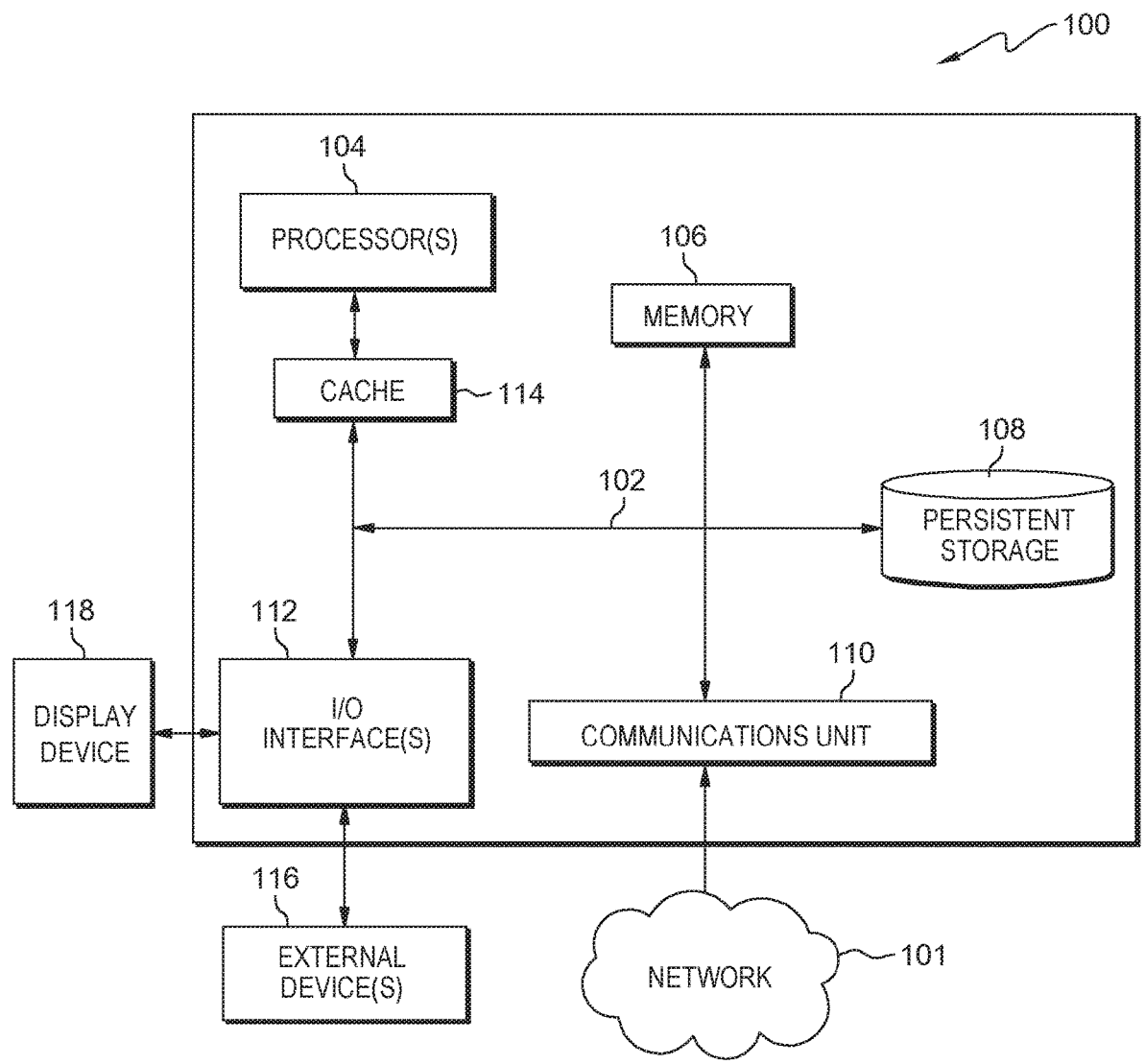
FIG. 1 depicts a block diagram of a computing node of a cloud computing environment, in accordance with an embodiment of the present invention.

FIG. 1 depicts a block diagram of a computing node 100 of a network 101, in accordance with an embodiment of the present invention. It should be appreciated that FIG. 1 provides only an illustration of one implementation and does not imply any limitations with regard to the computing node 100, in which different embodiments may be implemented. Many modifications to the depicted computing node 100 may be made.

The computing node 100, may be a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed network 101 that include any of the above systems or devices, and the like.

Computer system/server may be described in the general context of computer system-executable instructions, such as program modules, being executed by a computer system. Generally, program modules may include routines, programs, objects, components, logic, data structures, and so on that perform particular tasks or implement particular abstract data types. Computer system/server may be practiced in distributed network 101 where tasks are performed by remote processing devices that are linked through a communications network. In a distributed network 101, program modules may be located in both local and remote computer system storage media including memory storage devices.

The computing node 100 includes communications fabric 102, which provides communications between computer processor(s) 104, memory 106, persistent storage 108, communications unit 110, and input/output (I/O) interface(s) 112. Communications fabric 102 can be implemented with any architecture designed for passing data and/or control information between processors (such as microprocessors, communications and network processors, etc.), system memory, peripheral devices, and any additional hardware components within a system. For example, communications fabric 102 can be implemented with one or more buses.

The computing node 100 is capable of communicating with other computer subsystems via cloud computing environment 202. Cloud computing environment 202 can be, for example, a local area network (LAN), a wide area network (WAN) such as the Internet, or a combination of the two, and can include wired, wireless, or fiber optic connections. In general, cloud computing environment 202 can be any combination of connections and protocols that will support communications between computing node 100 and other computing devices.

Memory 106 and persistent storage 108 are computer-readable storage media. In one embodiment, memory 106 includes random access memory (RAM) and cache memory 114. In general, memory 106 can include any suitable volatile or non-volatile computer-readable storage media.

Memory 106 is stored for execution by one or more of the respective computer processors 104 of computing node 100 via one or more memories of memory 106 of computing node 100. In the depicted embodiment, persistent storage 108 includes a magnetic hard disk drive. Alternatively, or in addition to a magnetic hard disk drive, persistent storage 108 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 108 may also be removable. For example, a removable hard drive may be used for persistent storage 108. Other examples include optical and magnetic disks, thumb drives, and smart cards that are inserted into a drive for transfer onto another computer-readable storage medium that is also part of persistent storage 108.

Communications unit 110, in the examples, provides for communications with other data processing systems or devices, including computing node 100. In the examples, communications unit 110 includes one or more network interface cards. Communications unit 110 may provide communications through the use of either or both physical and wireless communications links.

I/O interface(s) 112 allows for input and output of data with other devices that may be connected to computing node 100. For example, I/O interface 112 may provide a connection to external devices 116 such as a keyboard, keypad, camera, a touch screen, and/or some other suitable input device. External devices 116 can also include portable computer-readable storage media such as, for example, thumb drives, portable optical or magnetic disks, and memory cards. Software and data used to practice embodiments of the present invention, e.g., regulation program 420 can be stored on such portable computer-readable storage media and can be loaded onto persistent storage 108 of computing node 100 via I/O interface(s) 112 of computing node 100. Software and data used to practice embodiments of the present invention, e.g., regulation program 420 can be stored on such portable computer-readable storage media and can be loaded onto persistent storage 108 of computing node 100 via I/O interface(s) 112 of computing node 100. I/O interface(s) 112 also connect to a display 118.

Display 118 provides a mechanism to display data, for example, a computer monitor.

Figure 2:
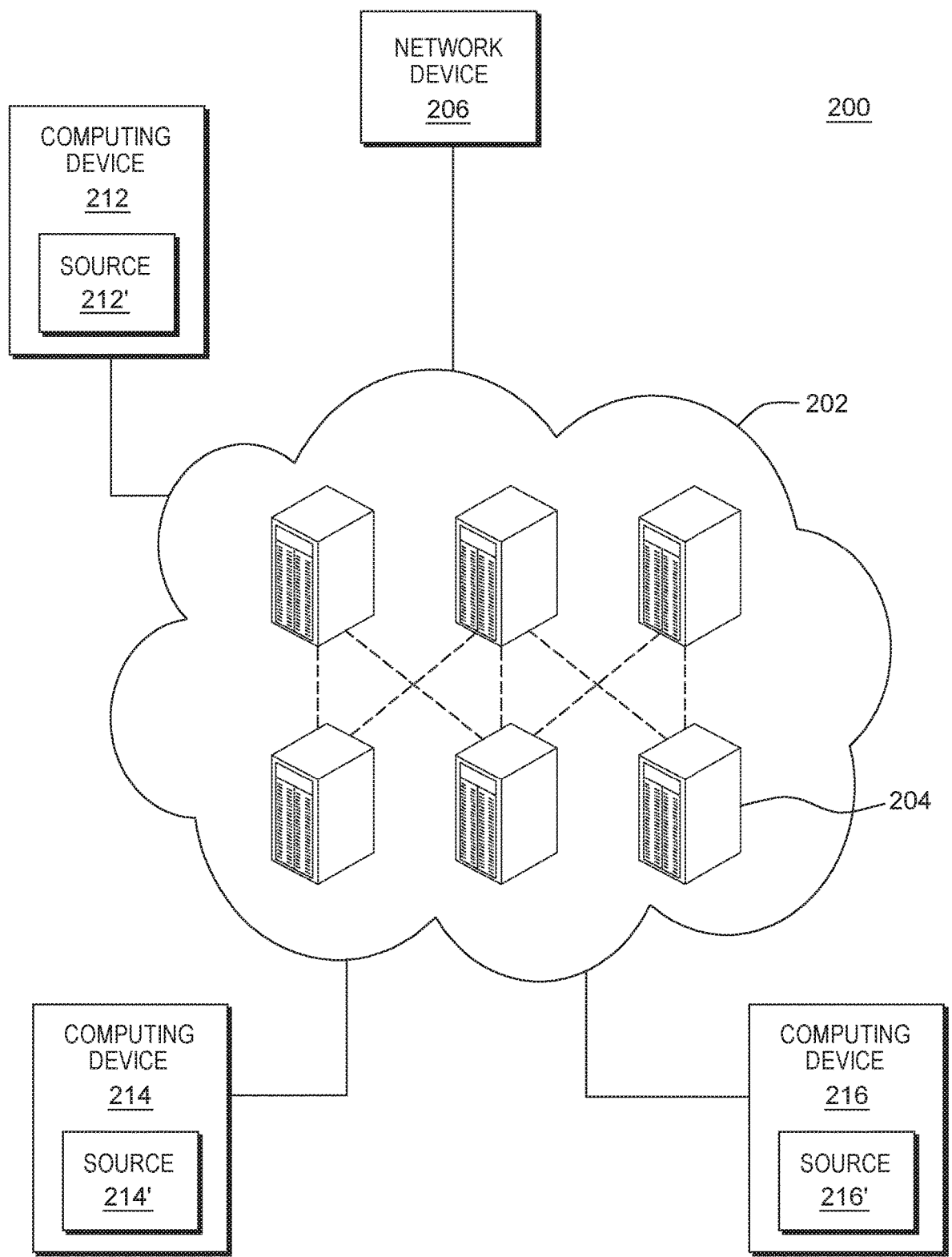
FIG. 2 depicts a block diagram depicting a cloud computing environment, in accordance with one embodiment of the present invention.

FIG. 2 depicts a block diagram depicting a cloud computing environment 200, in accordance with one embodiment of the present invention. FIG. 2 provides an illustration of one embodiment and does not imply any limitations regarding the cloud computing environment 200 in which different embodiments may be implemented. The cloud computing environment 200 may include additional computing devices, servers, components, or additional devices not shown.

Cloud computing environment 200 is comprised of one or more nodes 204. This allows for infrastructure, platforms and/or software to be offered as services from cloud computing environment 200 so as to not require each client to separately maintain such resources. Cloud computing environment 200 may be network 101 from FIG. 1. It is understood that the types of nodes 204 are intended to be illustrative only and that cloud computing environment 200 can communicate with any type of computerized device (e.g. computer node 100) over any type of network and/or network/addressable connection (e.g., using a web browser). The cloud computing environment 200 may be a local area network (LAN), a wide area network (WAN) such as the Internet, any combination thereof, or any combination of connections and protocols support communications computing devices connected to cloud computing environment 200 in accordance with embodiments of the invention. cloud computing environment 200 may include wired, wireless, or fiber optic connections.

Nodes 204 may communicate with one another. They may be grouped (not shown) physically or virtually, in one or more networks, such as private, community, public, or hybrid clouds as described hereinabove, or a combination thereof. This allows cloud computing environment 200 to offer infrastructure, platforms, and/or software as services for which a cloud consumer does not need to maintain resources on a local computing device. It is understood that the types of network device 206 and computing devices 212, 214, and 216 shown in FIG. 2 are intended to be illustrative only and these computing devices are computing nodes 204 within the network 202 and can communicate with any type of computerized device over any type of network and/or network addressable connection (e.g., using a web browser).

Network device 206 may be described in the general context of computer system executable instructions, such as program modules, being executed by a computer system. Generally, program modules may include routines, programs, objects, components, logic, data structures, and so on which perform particular tasks or implement particular abstract data types. In additional embodiments, network device 206 may be a desktop computer, laptop computer, tablet computer, netbook computer, personal computer (PC), a desktop computer, mobile device, or any programmable electronic device capable of receiving a signal or data from computing node 100 and additional computing devices connected to cloud computing environment 200. In additional embodiments, network device 206 may be practiced in distributed cloud computing environments where tasks are performed by remote processing devices which are connected through a communications network. In a distributed cloud computing environment, program modules may be located in both local and remote computer system storage media including memory storage devices. In the depicted embodiment, network device 206 contains content program 106, database 112 and is connected to cloud computing environment 200.

The network devices 212, 214, and 216 include one or more associated content 212', 214', and 216'. The network devices 212, 214, and 216 are in communications with the nodes 204, and the one or more network devices 206 via the network 202. The network devices 212, 214, and 216 include, but are not limited to, World Wide Web servers, Internet servers, file servers, other types of electronic information servers, and other types of server network devices (e.g., edge servers, firewalls, routers, gateways, etc.). Content 212', 214', and 216' are representations of the information which is associated in one or more ways with the entity. The content 212', 214', and 216' may be located one the depicted devices, or may be located on one or more computing nodes 204 of network 202 within cloud computing environment 200.

Figure 3:
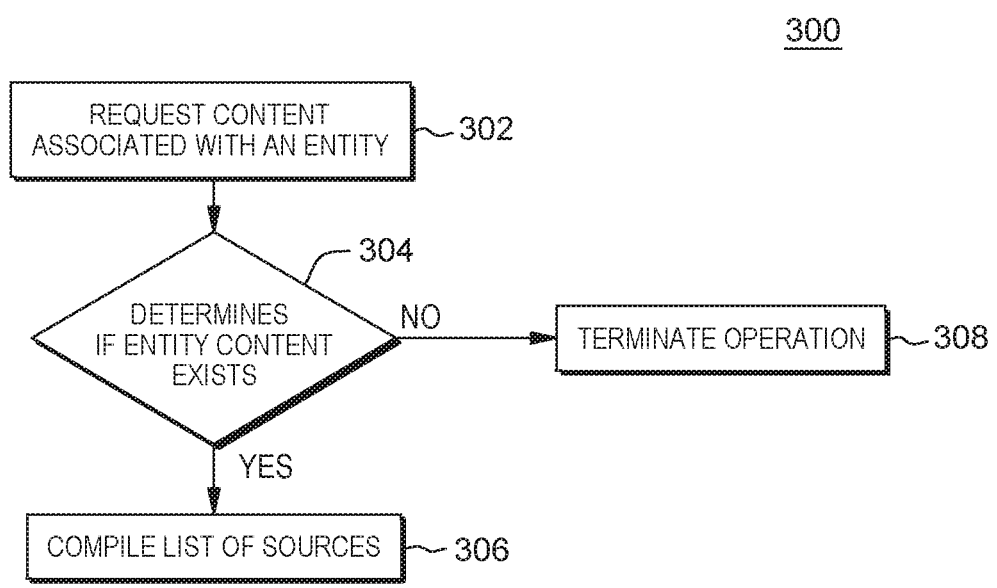
FIG. 3 depicts a flowchart of the operational steps taken by a program to build a content library, in accordance with one embodiment of the present invention.

FIG. 3 depicts a flowchart of the operational steps taken to build the initial library, in accordance with one embodiment of the present invention. FIG. 3 provides an illustration of one embodiment and does not imply any limitations regarding cloud computing environment 200 in which different embodiments may be implemented. Many modifications to the depicted flowchart may be made.

In step 302, a request is made to locate content associated with an entity. The entity may be, but not limited to, any company, person, place, event, thing, or concept. The request is associated with the entity and directed to locating and gathering of any and all information related, associated, or directed towards the entity. When the request is made at least one entity identifier is established for the search to be performed. The identifier is a name, address, URL, or other means to identify the entity. In one embodiment, the request is automatically made once one or more entities are discovered. In this embodiment, the automatic gathering of the one or more entities. This creates a method which is able to search for the presence of content across a plurality (potentially thousands if not millions) of entities to make requests to locate associated content. In some embodiments, the request comes from a person. In additional embodiments, the request is automatically created. The automatic request may be created at a predetermined time and at predetermined intervals. For example, the request may be sent every twenty-four hours. There may be more than one request made related to one entity at a time. In additional embodiments, there may be several requests for several entities at once. When this occurs, the entities may be placed in queue where the request is initialed asynchronous based on a predetermined set of variables.

In step 304 it is determined if the entity exists within the could computing environment. Through the request for the existence of any content associated with the entity, a determination is made which verify the entity's online presence. The sources may be, but not limited to nodes 204 within the cloud computing environment 200 or third-party sources 206 connected to or part of the cloud computing environment 200. Examples of content are, web pages, meta data, content marketing, media sharing, blogs, social bookmarking, microsites, review sites, social media point of presence, or the like which may have an association with the entity based on the established identifiers. In some embodiments, a plurality of identifiers associated with the entity are used to locate content and/or content sources. If at least one source is located with content associated with the entity (YES branch, proceed to step 306) a determination is made to determine if the source requires a request to gather the content. If no content sources are discovered (NO branch, proceed to step 308) the operation is terminated and the library for the entity is not created.

When a source is identified, a library is created for that entity. The library is a location where any content, sources, or related information is stored. The library is used to centralize all content sources, content items, and content types associated with that entity. One entity, within their library, may have one or more sources. Each source may be categorized by the content included within that source. For example, one source may have photos, videos, text, reviews, or another form of media. In some embodiments, each source is automatically categorized as a content type e.g. audio, video, image, news, events, etc. This is based on the source type. For example, Instagram is identified as a photo type source, while twitter is identified as a news type source. In some embodiments, these sources are pre-categorized by a type. In one embodiment the source includes multiple types causing the categorization to occur with each content item.

In step 306, a list of the sources is compiled. This list of sources is stored within the library and is a compile list of all relevant sources associated with the entity. The list may be organized and categorized based on a desired designation or categorical method. In some embodiments, the location or address of the source is retained with the source data. In additional embodiments, various other information may be retained with the entity that may assist the gathering of the content when new content is created in $3^{rd}$ party networks.

In step 308, the operation is terminated if no content or content sources are associated with the entity is located. The program determines that the entity does not exist and terminates the operation. The termination may provide a log or report associated with the entity and the lack of content and content sources found.

In some embodiments, this process may be performed once per entity. In additional embodiments, this process may be performed more than once, at predetermined intervals, or times as desired or requested.

Figure 4:
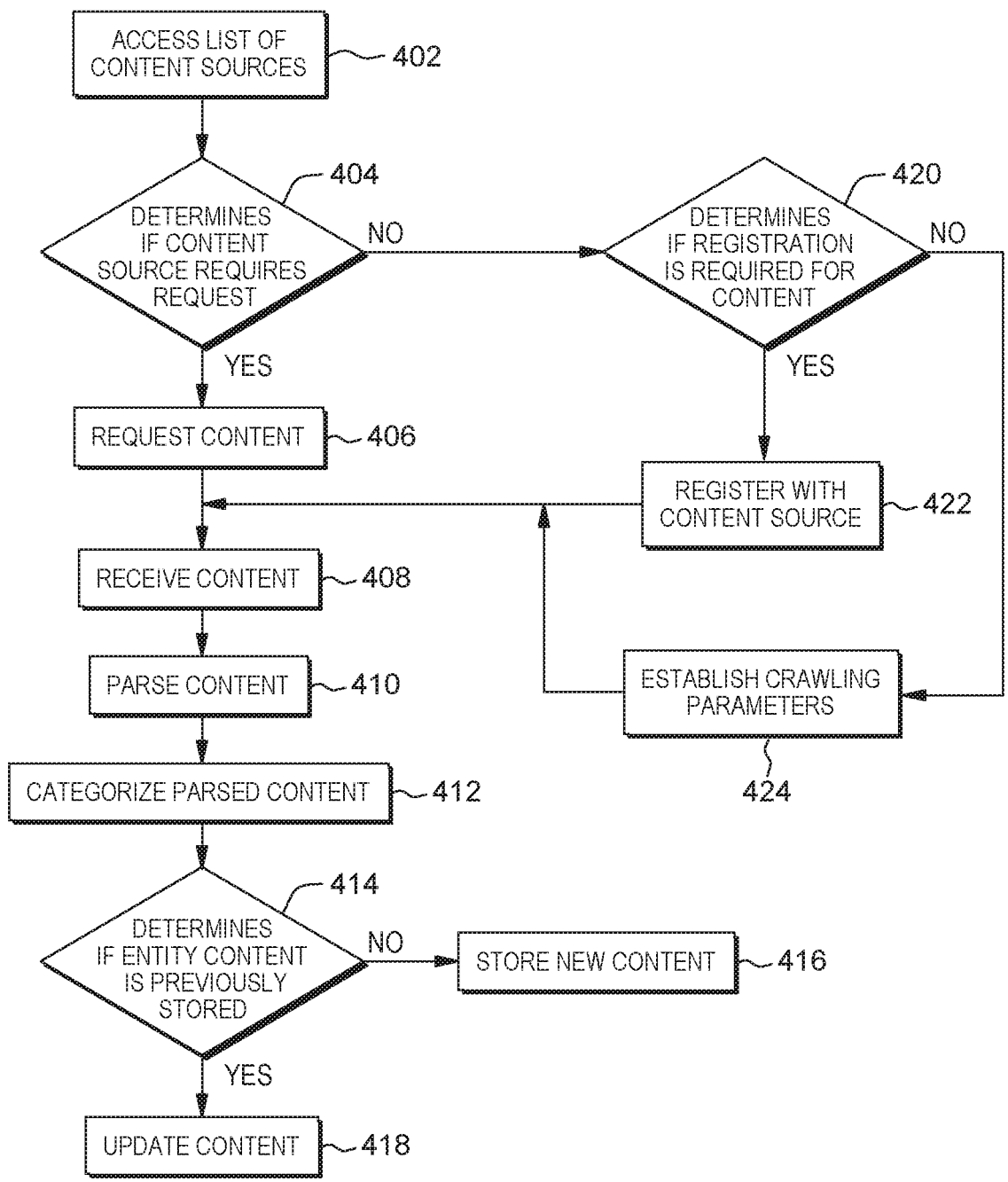
FIG. 4 depicts a flowchart of the operational steps taken by a program to populate the content library with content, in accordance with one embodiment of the present invention.

FIG. 4 depicts a flowchart of the operational steps taken by a program to populate the content library with content items, in accordance with one embodiment of the present invention. FIG. 4 provides an illustration of one embodiment and does not imply any limitations regarding cloud computing environment 200 in which different embodiments may be implemented. Many modifications to the depicted flowchart may be made.

In step 402, the list of content sources is accessed based on the entity which is being processed. Once the entity has been selected for processing, the associated list of sources is accessed to begin the processing. The list is compiled of all the sources located in FIG. 3. The list may be in a predetermined order based on a predetermined hierarchy of sources or may be taken as they are ordered within the library. In some embodiments, a portion of entities is taken to be processed at once. In other embodiments, the sources are processed one at a time. The list of content sources may be accessed at predetermined interval.

In step 404 it is determined if a request is required to gather the content. Each source has a different method in which the content can be gathered. Some sources, require a request to be able to have the content provided to the program. If a formal request is required (YES branch, proceed to step 406) a request is sent to the source for the content associated with the entity. The request may, have specific requirements or designations as to the items or type of content desired. In some embodiments, the request is for all or substantially all content associated with the entity. If no request is required (NO branch, proceed to step 420) a determination is made if registration with the source is required for the content.

In step 406, the request for the content is generated. The request is dependent upon the source and the source's requirements for the request. The program determines the requirements for the request and generates a request along the source's guidelines. In some embodiments, more than one request is made to a source. In some embodiments, multiple sources are requested at once. In some embodiments, the requests are queued based on order received or preferential treatment of the content. In yet additional embodiments, the requests are ordered, creating an asynchronous process of gathering the content.

In step 408, the requested content is received. The received content is gathered in the storage location in a raw format or format specific to the source. This content is in an unusable state as a plurality of excess information is included. In some embodiments, when the content is received, an additional search is performed on the content, for any direct or indirect links which were included in the content but based on the source may not have been processed or searched for content regarding the entity. This may create another content source which would result in the program directing this additional content source to STEP 310. This process may continue substantially indefinitely until an end of the sources associated with the entity are located.

In step 410, the content is parsed. In some embodiments, the content received from the content source will most often be in the form of a JSON Object but may also be a HTML snippet, XML or other type of packaging. Due to this wide array of potential forms of the content received, nearly all content will need to be normalized and meta data may need to be removed. The program preforms this parsing or removal of unnecessary information. In one embodiment, the final form of the content is segmented into a set of fields associated with each content type. As stated above many of the sources have predesignated types to assist in the parsing of the content. In some embodiments, the content is parsed generically and unrelated to the content type. In additional embodiments, the content is first parsed based on the source type and then a generic parsing is performed for the various other types of content. In some embodiments, the content is parsed based on the predetermined code or language which the content was received in. The parsing may be performed in a specific process based on this code or language. The program is able to decipher the language and code and adjust the parsing process based on that language or code. For example, the content may be gathered in, HTML, JavaScript Object Notation (JSON), JPEG, MP3, XML, or other types of packaging formats and data types and the program is able to adjust the parsing techniques to each of these languages.

In step 412 the parsed content is categorized. The categorization of the parsed content provides a structured system in which the content is stored and accessed. This categorization allows for improved locating of content and gathering of content based on a request for the content. When the content is parsed, the content source, content item, content type, and additional information is categorized based on a predetermined set of categories. For example, an event Content Type will have fields such as start time, end time, title and description. Those fields will be the ones used for insertion into the database when the Content Item is of type, "Event."

In step 420 a determination is made if registration is required for the content. Some sources require a listening method to access the content. Instead of making a formal request, or crawling the source, the program registers with the source, so that the source is informed of the content the program desires, and upon the source locating or finding content associated with the entity, the content is sent to the program by the Content Source. If it is determined that the source requires registration to access the content (YES branch, proceed to step 418) the program registers with the source. If it is determined that the source does not require registration (No branch, proceed to step 416) a crawler is established.

In step 422 the program registers with the source. The registration may have various requirements based on the source. In one embodiment, the registration requires various tags or identifiers associated with the entity.

In step 424 a crawler is configured for obtaining the content. A crawler may be described as a computer program configured to obtain content from sources using information about an entity as provided by its address or Universal Resource Locator (URL), metadata, and other criteria found or provided about the entity. A web crawler may be viewed as a crawler module (that generates work items—URLs that should be accessed) and a fetcher module (that obtains work items generated by the crawler module and retrieves content based on the URLs associated with the work items). In some embodiments, the crawler is run once. In additional embodiments, the crawler is run periodically to update previously stored data.

In step 414, a determination is made to determine if the gathered content was previously stored in the content library. The program after categorizing the content performs an analysis on the content library to determine if the content is new, old, or a modified version of existing content. After the initial build of the content library, additional content may be categorized from one or more sources, and it is beneficial to store this content. It is ideal to keep the most current and up-to-date content associated with the entity in the library. New content related to an entity which is not present is stored in the library. For example, all content created after the date of the previous request would be considered new content. Or it may be content which has been located from new sources. If it is determined that the content is new material (NO branch, proceed to step 416) the content is stored. If it is determined that the content is not new (YES branch, proceed to step 418) the program updates the content in the library.

In step 418, the content is updated. When it is determined that similar content already exists in the entity library (or libraries). The program updates the current content with the newly received content. This is to maintain a library of the most recent content and ensure old content which has been updated within the Content Source is updated within the Program. In some embodiments, an identifier is provided by the Content Source to uniquely identify every Content Item. If the identifier already exists in the program, then an update occurs.

In step 416, the content is stored in the content library based on the categories and predetermined features of the specific content item(s). In some embodiments, the content may be stored in more than one library based on the potential of a multitude of entities being associated with a single Content Source.

This process is performed at least once on the entity and may be performed continuously, at the direction of a third party, or at a predetermined interval. The process is performed substantially the same for each iteration.

Figure 5:
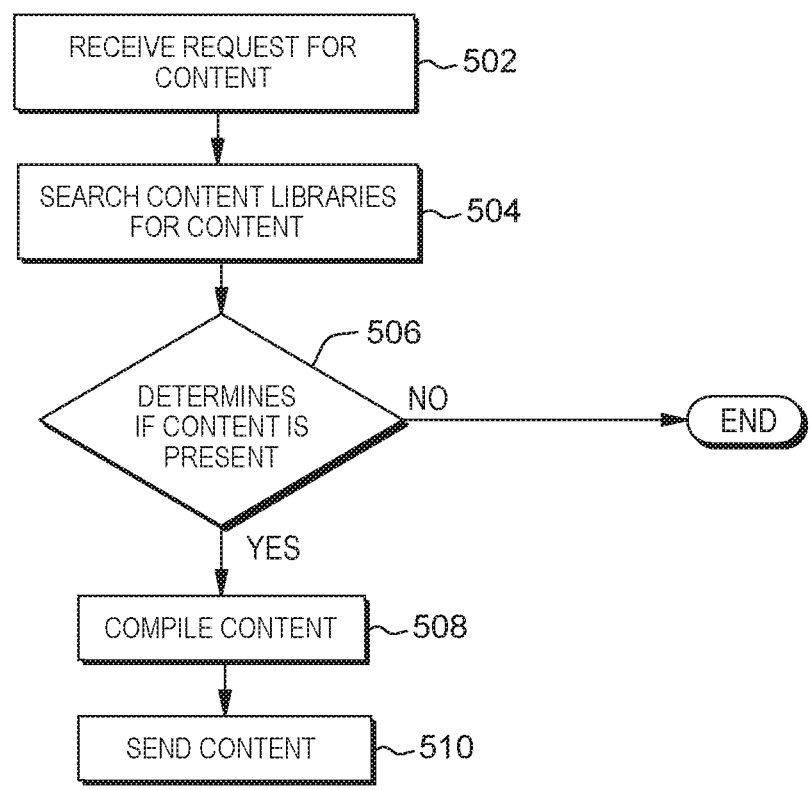
FIG. 5 depicts a flowchart of the operational steps taken by the program when a request is received for content from the library, in accordance with one embodiment of the present invention.

FIG. 5 depicts a flowchart of the operational steps taken to send content based on a request, in accordance with one embodiment of the present invention. FIG. 5 provides an illustration of one embodiment and does not imply any limitations regarding computing environment 200 in which different embodiments may be implemented. Many modifications to the depicted flowchart may be made.

In step 502, a request is received for content associated with an entity. The request may come from the entity, a third party, or any party interested in having the content. The request is received through the program and processed through based on the parameters of the request. In some embodiments, the requests are received based on a template or predetermined setting.

In step 504, the libraries are searched for content associated with the parameters of the request.

In step 506, a determination is made regarding the presence of content associated with the parameters of the request. For example, a request might be made for all Content Items of type Event for a given zip code. This would search across all Entities in the zip code and return a list of their combined events. If the program determines that content that meets the parameters of the request (YES branch, proceed to step 508) the content is compiled. If the program determines that the content does not exists (NO branch, proceed to END), the program provides a lack of content or report to the party about the absence of content.

In step 508 the content is compiled. The compiling of the content is based on the parameters of the request. This may be related to the type of content requested, the amount of content, the date range of content, the source of content, the items of the content, or other categories or factors associated with the content. The content may be modified or altered in a way to be preferred by the requesting party. In some embodiments, the raw content is compiled without any edited. In step 510 the content is accessible by the requesting party. In additional embodiments, the content may be provided to the requesting party. In some embodiments, the request adds predetermined design, formatting, structuring, and functional elements to the data set. For example, if the data set is designed to be structured into a webpage or blog entry, the content is modified from the raw categorized content into specific content structure.

In step 510, the content is sent to the party. The send of the content may be merely providing restricted access to the party of the content within the library storage device. In some embodiments, the content is sent to the party via various electronic communication methods or processes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the computer, partly on the computer, as a stand-alone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

What is claimed:

1. A computer system product for categorizing content related to an entity comprising:
    one or more computer processors, one or more computer readable storage media, and program instructions stored on the one or more computer readable storage media for execution by, at least one of the one or more processors, the program instructions comprising:
    program instruction to locate at least one source associated with an entity and identify a source type and content types contained within the source;
    program instructions to access the at least one source based on the source specific access method, wherein the content can be collected;
    program instructions to access the at least one source to collect a first set of content, wherein the content is based on the source type and the content types within the source;
    program instructions to normalize the first set of content collected and remove meta data from the first set of content creating a second set of content;
    program instructions to parse the second set of content to a predetermined data format based on the content type;
    program instructions to compare the second set of content with a previously collected third set of content, and determine if any content between the second set and the third set are identical, and excluding the identical content; and
    program instructions to categorize the second set of content based on a predetermined set of categories, wherein the categories are based on the source type and the content type.

2. The computer system of claim 1, wherein it is determined if the compared second set of content and the third set of content are not identical, program instructions to incorporate the portions of the second set of content which is not identical to the third set of content.

3. The computer system of claim 1, further comprising program instructions to determine if the at least one source requires registration to access the at least one source's content.

4. The computer system of claim 1, further comprising program instructions to perform the steps to register with the at least one source to access the content.

5. The computer system of claim 1, further comprising program instructions to request a predetermined set of content from the at least one source.

* * * * *